Jan. 6, 1959 D. B. CHURCHILL 2,867,721

REGENERATIVE PHANTASTRON TIME DELAY CIRCUIT

Filed March 27, 1953

INVENTOR
DELOS B. CHURCHILL
BY
Roland A. Anderson
ATTORNEY

United States Patent Office 2,867,721

Patented Jan. 6, 1959

2,867,721

REGENERATIVE PHANTASTRON TIME DELAY CIRCUIT

Delos B. Churchill, East Norwich, N. Y., assignor, by mesne assignments, to the United States of America as represented by the United States Atomic Energy Commission Application March 27, 1953, Serial No. 344,951

4 Claims. (Cl. 250—27)

The present invention relates to a method and apparatus for providing extremely short and accurate time delays between two electrical impulses in an electronic circuit.

During recent years, the phantastron time delay circuit has been used in commercial and military radar applications and other electronic circuits wherein the duty cycle of the circuit is to be controlled. In other applications, such as in a neutron velocity spectrometer, the phantastron circuit can be used to accurately control the operating time of a plurality of individual counting channels. That is, each channel must be open to incoming neutron bursts for an exact time interval before the next channel becomes operable. In such an application the operating time of the channel may vary from a fraction of a microsecond up to many hundred microseconds.

The use of phantastron circuits for time delay purposes has been clearly described in an article appearing in Electronics, April 1948, pages 100–107, entitled "Design of phantastron time delay circuits" by R. N. Close and M. T. Lebenbaum. This article describes how the anode voltage of a pentode vacuum tube can be made to decrease at a linear rate to its "bottoming voltage" and provide the required time delay interval.

The time interval control of the phantastron circuit can be varied by changing the operating potentials of the various elements of the circuit. However, due to the finite operating times of the elements and the discharge time of condensers and the like, a lower limit is reached in the time delay introduced by the phantastron which is in the order of twenty microseconds. Therefore, if it is necessary to provide a shorter time interval, the conventional phantastron circuit cannot be used. However, the method and apparatus embodying the present invention are capable of reducing the time delay down to a fraction of a microsecond. Accordingly, it can be used to provide extremely short and accurate time delays between an introduced electrical impulse and an emitted electrical impulse.

More particularly, the present invention includes a phantastron time delay circuit in combination with means for terminating the linear descent of the phantastron anode voltage at a predetermined value higher than the normal anode bottoming voltage.

It is therefore an object of the present invention to provide an improved method and apparatus for obtaining short and accurate time delays.

A second object of the present invention is to provide an improved method and apparatus for reducing the inherent minimum time delay of conventional phantastron time delay circuits.

Another object of the present invention is to provide an improved method and apparatus for terminating the linear descent of the phantastron anode voltage at a predetermined value higher than the normal anode bottoming value.

Still another object of the present invention is to provide an apparatus connected to the output of a phantastron time delay circuit for establishing a negative voltage pulse at a predetermined instant to end conduction in the phantastron tube.

The many objects and advantages of the present invention may best be appreciated by reference to the accompanying drawings, the figures of which schematically illustrate a circuit incorporating a preferred embodiment of the present invention and capable of carrying out the method of the invention.

In the drawings:

Figure 2 includes sub-figures 2*a* to 2*e* inclusive.

Figure 1:
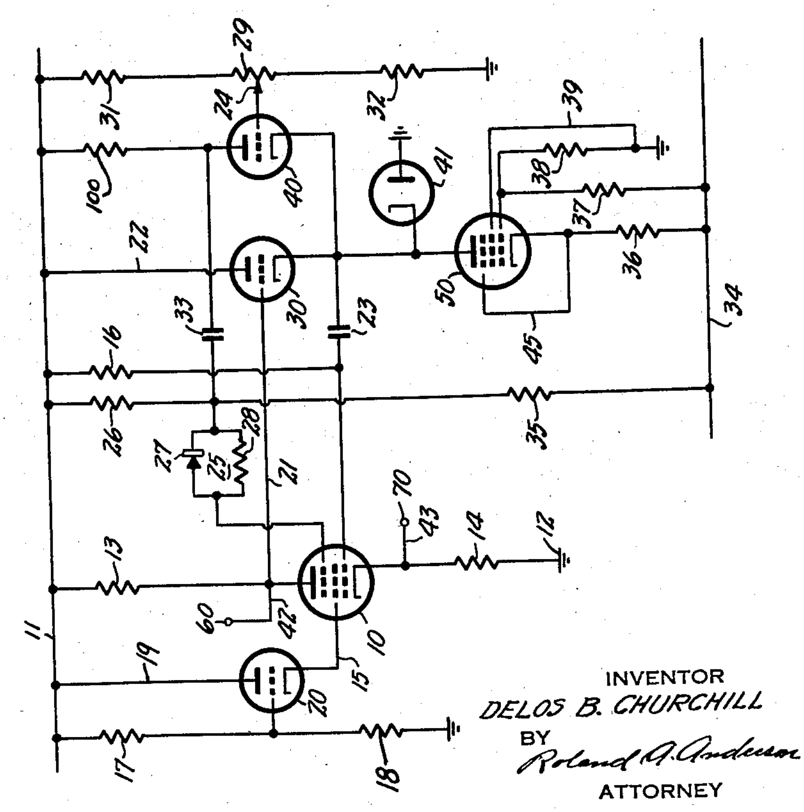
Figure 1 is a schematic diagram of an electronic circuit capable of carrying out the method of the present invention.

Referring now to Figure 1, the phantastron tube 10 is shown connected between the positive unidirectional power supply conductor 11 and the common ground 12. The anode of tube 10 is connected to power supply conductor 11 through anode resistor 13 and to input terminal 60 by a lead 42; its cathode is connected to ground through resistor 14 and to output terminal 70 by a lead 43. The control grid or grid No. 1 of tube 10 is connected to conductor 11 through resistor 16 and the screen grid or grid No. 2 is directly connected to the cathode of tube 20 by conductor 15. The control grid of tube 20 is connected to conductor 11 through resistor 17 and to ground through resistor 18. The anode of tube 20 is directly connected to conductor 11 by a lead 19.

The suppressor grid or grid No. 3 of the phantastron tube 10 is connected to conductor 11 through a parallel combination 25 and a resistor 26 in series. Combination 25 is composed of a diode 27 and a resistor 28 in parallel.

The anode of tube 10 is also connected by means of conductor 21 to the control electrode of cathode follower tube 30. The anode of tube 30 is connected to conductor 11 by lead 22 and its cathode is coupled to grid No. 1 of tube 10 through a condenser 23. The cathode of tube 30 is also directly connected to the cathode of tube 40. The control electrode of tube 40 is connected to the movable arm 24 of a potentiometer 29. One side of potentiometer 29 is connected to conductor 11 through a resistor 31 and the other side is connected to ground through a resistor 32. The anode of tube 40 is coupled to the parallel combination 25 through a condenser 33, and this junction is connected to a negative unidirectional power supply conductor 34 through resistor 35. The anode of tube 40 is connected to conductor 11 through a resistor 100.

The cathodes of tubes 30 and 40 are directly connected to the anode of tube 50 which has its cathode connected to power supply conductor 34 through a resistor 36. The control grid of tube 50 is connected to conductor 34 through a resistor 37 and to ground through a resistor 38; its screen grid is directly connected to ground by a lead 39 and its suppressor grid is directly connected to its cathode by a lead 45. A diode 41 is also connected between the anode of tube 50 and ground.

The operation of a conventional phantastron circuit will now be described with the aid of Figure 1 and the solid line wave forms illustrated in Figure 2. The operation of the phantastron time delay circuit will be divided into six separate stages, each of which depict a different phase of operation of the circuit.

Figure 2:
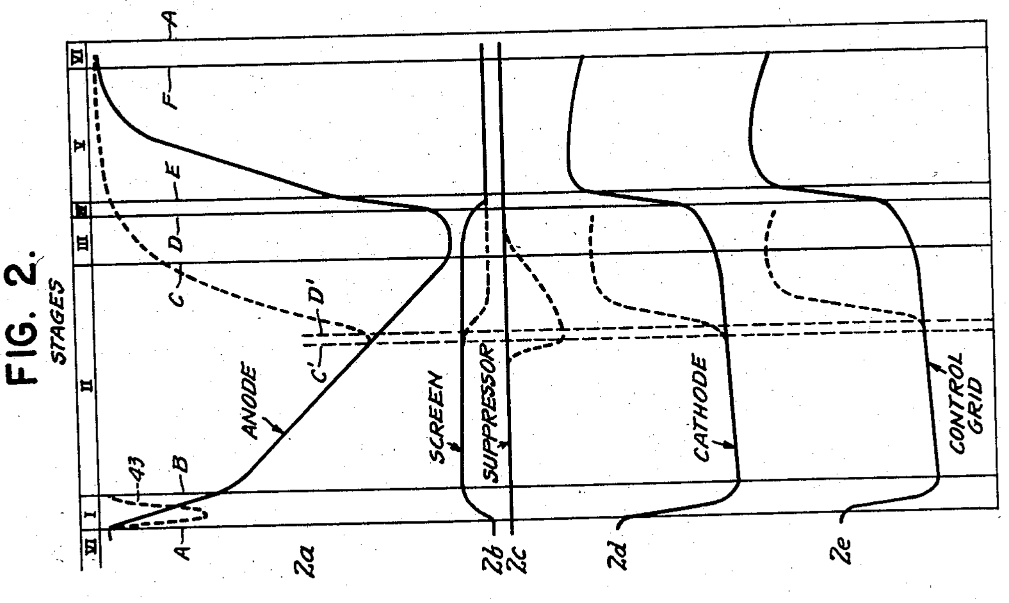
Figure 2 shows wave forms of the voltages at indicated positions of a conventional phantastron circuit upon which is superimposed dotted wave forms representing voltages at indicated positions of the circuit of Figure 1.

In Figure 2, Figure 2*a* represents the wave form of the voltage appearing on the anode of phantastron tube 10. Figure 2*b* represents the voltage difference between its screen grid or grid No. 2 and its cathode. Figure 2*c* represents the voltage at the suppressor grid or grid No. 3 of tube 10. Figure 2*d* illustrates the voltage on the cathode of tube 10 and Figure 2*e* illustrates the voltage at the control grid or grid No. 1 of tube 10.

The quiescent condition exists when tube 10 is drawing only screen current through tube 20 which serves as a regulator tube to maintain the phantastron screen voltage at a constant value. The potential on the suppressor grid of phantastron tube 10 is negative with respect to the potential of its cathode due to the voltage divider network made up of resistors 26 and 35. Because of this potential, no anode current flows through tube 10. The cathode follower tube 30 conducts with a current determined by constant current pentode 50. Conduction through tube 30 establishes a high cathode potential which is sufficient to keep tube 40 in a non-conductive condition. During the quiescent condition, the voltages at the various electrodes of phantastron tube 10 have potentials as appearing in Stage VI and just before line A.

The operation of the phantastron time delay circuit is initiated by a negative trigger pulse applied to terminal 60 and to the anode of tube 10 through conductor 42. This negative pulse is also applied through conductor 21 to the control electrode of cathode follower tube 30 which is the start of the regenerative action of Stage I shown between lines A and B of Figure 2. The negative pulse is indicated by dotted line 43. The potential on the cathode of tube 30 follows closely the potential as applied to its grid. Therefore, the negative pulse is applied to the control grid of tube 10 through condenser 23. This decreases the screen current in tube 10 resulting in a decrease of the potential on the cathode of this tube. This drop in the cathode voltage is equivalent to an increase in the voltage on its suppressor grid and when the potential of the cathode decreases sufficiently, the equivalent increase on the suppressor grid will initiate anode current flow in tube 10.

The initiation of anode current results in a negative pulse at the anode of tube 10, which pulse is applied to the control grid of tube 30 and in turn to the control grid of tube 10. The anode current through tube 10 soon reaches its stable pentode current value and the decrease of potential at its anode is momentarily arrested. However, condenser 23 is now charging through resistor 16 which causes a rise in the potential applied to the grid of tube 10.

This increase in grid potential further decreases the potential at the anode of tube 10. The decrease of potential at the anode of tube 10 is again fed back to its control grid through the cathode follower tube 30 to retard the rise of potential on this control grid. Therefore, the voltage on the anode of tube 10 will continue to fall at a relatively linear rate. This is the beginning of Stage II as shown between lines B and C of Figure 2.

When the potential at the anode of tube 10 falls to a very low value, it will cease to decrease at a linear rate and will remain almost constant. At this time the potential of the control grid of tube 10 will rise more rapidly because no anode potential drop is being fed back through the cathode follower tube 30. This is the start of Stage III shown between lines C and D of Figure 2. The intersection of line C with curves 2*d* and 2*e* shows the change of potential of the cathode and control grid of tube 10 respectively at this point.

As the potential on the control grid of tube 10 increases, the total tube current will increase and the potential on the cathode, as shown in Figure 2d, will rise with respect to the suppressor potential, shown in Figure 2*c*. When the cathode potential increases sufficiently, the suppressor grid (which is becoming more negative with respect to the cathode) will cause the space current to return to the screen grid. The regenerative action of Stage I is repeated in reverse, causing a sharp cutoff of anode current. This is shown in Stage IV of Figure 2 between lines D and E.

The cessation of anode current in tube 10 causes the potential of its anode to rise rapidly towards the potential on conductor 11. This large positive pulse is fed back from the anode to the control grid of tube 10 through the cathode follower tube 30. This develops a very large positive pulse at the cathode of tube 10, which pulse is used as the output pulse of the circuit and is emitted from terminal 70. Therefore, the time delay between the initial triggering pulse and the positive output pulse developed at the cathode of tube 10 is the time between Stages I and IV.

The voltage on the control grid and cathode of tube 10 continues to increase until grid current is drawn thereby discharging condenser 23. Since condenser 23 is not large enough to support heavy grid current, the voltage on the control grid goes only slightly positive with respect to the cathode. The potentials on the phantastron electrodes then return slowly through Stage V until they reach their quiescent values of Stage VI.

The time delay of the circuit may be varied by changing the operating potentials on the tube such as by changing the value of resistor 13 in the anode circuit of the phantastron tube. However, the time delay of Stage II comes to an end only when the anode voltage of Figure 2*a* has reached its bottoming value.

In the present invention means are added to the phantastron circuit for terminating the linear descent of anode voltage of Figure 2*a* at some variable predetermined point as indicated by dotted line C′ in Figure 2. This control is brought about by the use of tube 40 whose function was omitted in the above-described explanation of a phantastron time delay circuit because it does not appear in the conventional circuit.

As indicated above, tube 40 is in a normally non-conductive state due to the relatively high poential on its cathode which is coupled to the cathode of tube 30. The initiation of current through tube 40 will depend on the relative potential between its control grid and its cathode. The potential on the control grid is determined by the voltage dividing network made up of potentiometer 29 and resistors 31 and 32. This potential may be varied by the movable arm 24 of potentiometer 29.

In the circuit embodying the present invention the quiescent condition is the same as described above. The phantastron cycle is initiated by a negative electrical impulse applied to terminal 60 and to the phantastron tube 10. At the start of Stage II the anode potential of tube 10 starts to decrease at a linear rate, which potential is applied to the control electrode of the cathode follower tube 30. This decreases the current through tube 30 resulting in a lower potential at its cathode. Therefore, at a predetermined point the difference in potential between the control electrode of tube 40 and its cathode will be sufficiently decreased to initiate conduction through this tube. As previously described, this point can be varied by use of movable arm 24 in potentiometer 29.

When current is initiated in tube 40, a negative pulse is produced at its anode. This negative pulse is applied to the suppressor grid of tube 10 through condenser 33 and parallel combination 25. The diode 27 passes the leading edge of the negative pulse and restores control to the suppressor grid cutting off anode current in tube 10. This pulse is shown dotted in Figure 2*c* at line C′. As before, the cessation of anode current in tube 10 results in a large positive pulse at its anode which is fed back to its control grid. Line C′ therefore represents the end of Stage II.

Stage III is greatly reduced in this circuit as the potentials of the phantastron control grid and cathode start to increase rapidly with the increase in anode potential. That is, the use of tube 40 projects the circuit into the regenerative condition of Stage IV without the usual delay of Stage III which is indicated in Figure 2 between dotted lines C′ and D′.

Due to the above-described regenerative action of Stage IV, the potential of the phantastron cathode again quickly reaches a high positive value which is used as the output pulse of the circuit.

The inclusion of tube 40 therefore provides a means for terminating the linear descent of the anode voltage of the phantastron tube at a predetermined value of anode voltage, which value may be varied by means of potentiometer 29. The use of diode 27 in parallel combination 25 results in a gradual return of the suppressor voltage to its quiescent level, thereby precluding the possibility of a regenerative oscillation by tight coupling between anode and suppressor.

Therefore, a circuit embodying the present invention may be used to introduce a calibrated time delay between two electrical impulses. The first impulse is obtained from any other desired circuit and the second impulse is obtained from the cathode of the phantastron tube during Stage IV of the phantastron cycle. The second impulse therefore may be used to trigger other portions of the overall electronic circuit. For example, in a neutron velocity selector, neutrons travel from the source of neutrons to a detector placed some distance away. During this time interval the neutrons separate into groups in proportion to their energies. In order to determine the number of neutrons in each group, it is necessary to open a counting channel for a predetermined time interval and then close this channel and successively open and close a series of similar channels. The time interval between the first electrical impulse and the second impulse derived from the phantastron circuit can be used to govern the "on" time of each counting channel. This time may be varied by varying potentiometer 29 of the circuit illustrated in Figure 1. The first electrical impulse is derived from an external source which is used to divide the range of energies of the neutrons, such as a neutron shutter.

While the salient features of this invention have been described in detail with respect to only one circuit, it will of course be apparent that numerous modifications may be made within the spirit and scope of this invention and it is therefore not desired to limit the invention to the exact details shown except in so far as they may be defined by the following claims.

I claim:

1. A regenerative circuit for providing extremely short and accurate time delays between a first and a second electrical impulse which comprises in combination, a vacuum tube having an anode, a cathode and a plurality of grid electrodes including a first control grid and a suppressor grid, means for supplying operating potentials to said vacuum tube so that, independent of said first electrical impulse, it is in a normally non-conductive state, a cathode follower tube having a second control electrode directly connected to said anode, said first electrical impulse being applied to said first control electrode to initiate the flow of anode current and giving rise to an output pulse at said anode, said output pulse being applied through said cathode follower to said first control grid, a normally, independent of said first electrical impulse, non-conducting amplifier tube cathode-coupled to said cathode follower, and having its anode connected to said suppressor grid through a condenser, said amplifier tube having a third control electrode, means for maintaining the potential of said third electrode fixed independent of said first electrical impulse whereby the flow of current through said cathode follower tube starts conduction in said amplifier tube at a predetermined time giving rise to a negative output pulse at the anode of said amplifier tube which pulse is applied to said suppressor grid to return said vacuum tube to its normally non-conductive state.

2. A regenerative circuit for providing extremely short and accurate time delays between a first and a second electrical impulse which comprises, in combination, a vacuum tube, having an anode and a first control grid, which, independent of said first electrical impulse, is in a normally non-conductive state, a cathode follower tube having a second control electrode directly connected to said anode and also having its cathode coupled to said first control grid, said first electrical impulse being applied to said second control electrode of said cathode follower giving rise to an output pulse at the cathode thereof, said output pulse being applied to said first control grid to initiate conduction in said vacuum tube and giving rise to a negative pulse at said anode thereof, said negative pulse being fed back through said cathode follower to said first control grid whereby the voltage at said anode of said vacuum tube decreases at a linear rate, means, having a control potential thereof fixed independent of said first electrical impulse, for producing a negative output pulse when said plate voltage has reached a predetermined value, said negative output pulse being applied to said suppressor grid of said vacuum tube to return it to its normally non-conductive state.

3. A circuit for providing extremely short and accurate time delays between a first negative electrical impulse and a second electrical impulse which comprises, in combination, a vacuum tube having an anode, a cathode and a plurality of grid electrodes including a first grid and third grid, a cathode follower tube having its control electrode directly connected to said anode and also having its cathode connected to said first grid through a condenser, an amplifier tube cathode-coupled to said cathode follower tube, a control grid in said amplifier tube, said amplifier tube having its anode coupled to said third grid, means for supplying operating potentials to said tubes so that normally, independent of said first electrical impulse, said vacuum and amplifier tubes have no anode current conduction, means for maintaining the potential of said control grid fixed independent of said first electrical impulse whereby the application of said first electrical negative impulse to the control electrode of the cathode follower tube results in a voltage pulse at its cathode which voltage pulse is applied to said first grid to initiate anode current conduction therein, said amplifier tube starting to conduct at a predetermined time interval to return said vacuum tube to its normal non-conductive state.

4. A regenerative circuit for providing extremely short and accurate time delays between a first and a second electrical impulse which comprises, in combination, a vacuum tube having an anode, a cathode and a plurality of grid electrodes including a first control grid and a suppressor grid, means for supplying operating potentials to said vacuum tube so that, independent of said first electrical impulse, it is in a normally non-conductive state, a cathode follower tube having a second control electrode directly connected to said anode, said first electrical impulse being applied to said first control electrode to initiate the flow of anode current and giving rise to an output pulse at said anode, said output pulse being applied through said cathode follower to said first control grid, a normally, independent of said first electrical impulse, non-conducting amplifier tube cathode-coupled to said cathode follower, and having its anode connected to said suppressor grid through a condenser, said amplifier tube having a third control electrode, adjustable means for maintaining the potential of said third electrode fixed independent of said first electrical impulse whereby the flow of current through said cathode follower tube starts conduction in said amplifier tube at a predetermined time giving rise to a negative output pulse at the anode of said amplifier tube which pulse is applied to said suppressor grid to return said vacuum tube to its normally non-conductive state.

References Cited in the file of this patent

UNITED STATES PATENTS

| | | |
|---|---|---|
| 2,426,256 | Zenor | Aug. 26, 1947 |
| 2,487,822 | McLamore et al. | Nov. 15, 1949 |
| 2,549,875 | Williams et al. | Apr. 24, 1951 |
| 2,572,038 | Kinne | Oct. 23, 1951 |
| 2,582,190 | Corson et al. | June 8, 1952 |
| 2,642,532 | Mofenson | June 16, 1953 |
| 2,662,178 | Levell | Dec. 8, 1953 |
| 2,662,197 | Le Comte | Dec. 8, 1953 |
| 2,749,481 | Klein | June 5, 1956 |

OTHER REFERENCES

William and Moody, Ranging Circuits, Linear Time Base Generators etc. Jour. I. E. E. (London), vol. 93, part III, No. F, pp. 1188–1198.